United States Patent
Ost et al.

[15] 3,694,454
[45] Sept. 26, 1972

[54] 1-[1'-CARBOXYLIC ACYLAMINO-2',2',2-TRICHLORO)-ETHYL]-2-(HYDROCARBYLOXYCARBONYL-AMINO)-BENZIMIDAZOLES

[72] Inventors: Walter Ost; Klaus Thomas; Dietrich Jerchel, all of Ingelheim am Rhine, Germany

[73] Assignee: C. H. Boehringer Sohn, Ingelheim am Rhine, Germany

[22] Filed: July 17, 1970

[21] Appl. No.: 55,989

[52] U.S. Cl............260/309.2, 260/404, 260/456 A, 260/469, 260/481 C, 260/482 C, 260/487, 260/558 R, 260/559 B, 260/561 R, 260/561 N, 260/561 HL, 260/562 R, 260/562 B, 424/273
[51] Int. Cl.................................C07d 49/38
[58] Field of Search....................260/309.2

[56] References Cited

UNITED STATES PATENTS 3,574,845   4/1971   Actor et al..............260/309.2

FOREIGN PATENTS OR APPLICATIONS 1,114,069   5/1968   Great Britain..........260/309.2
1,523,597   3/1968   France....................260/309.2

OTHER PUBLICATIONS

Lecolier et al. Chem. Abst. Vol. 67, No. 73555c (1967). QD1.A51

*Primary Examiner*—Natalie Trousof
*Attorney*—Hammond & Littell

[57] ABSTRACT

Compounds of the formula

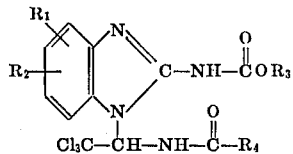

wherein
$R_1$ and $R_2$ are each hydrogen, chlorine, bromine, alkyl of one to four carbon atoms or alkoxy of one to four carbon atoms,
$R_3$ is alkyl of one to three carbon atoms or allyl, and
$R_4$ is hydrogen, alkyl of one to 17 carbon atoms which may have from one to three halogen substituents or one 2,4-dichlorophenoxy substituent attached thereto, phenyl, alkenyl of two to 17 carbon atoms and 1 to 3 double bonds, or alkoxy of one to 12 carbon atoms;
the compounds are useful as prophylactic as well as curative biocidal agents, especially as fungicidal agents against all types of Levow; Tobias E. fungi, such as mildew, plant rust, Fusaria and the like.

33 Claims, No Drawings

1-[1'-CARBOXYLIC ACYLAMINO-2',2',2'-TRICHLORO)-ETHYL]-2-(HYDROCARBYLOXYCARBONYL-AMINO)-BENZIMIDAZOLES

This invention relates to novel biocidal derivatives of benzimidazole as well as to a method of preparing these compounds.

More particularly, the present invention relates to a novel class of compounds represented by the formula

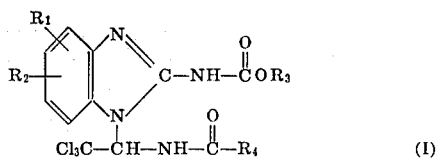

(I)

wherein
- $R_1$ and $R_2$ are each hydrogen, chlorine, bromine, alkyl of one to four carbon atoms or alkoxy of one to four carbon atoms,
- $R_3$ is alkyl of one to three carbon atoms or allyl, and
- $R_4$ is hydrogen, alkyl of 1 to 17 carbon atoms which may have from one to three halogen substituents or one 2,4-dichlorophenoxy substituent attached thereto, phenyl, alkenyl of two to 17 carbon atoms and one to three double bonds, or alkoxy of one to 12 carbon atoms.

The compounds embraced by formula I above may be prepared by various methods involving well known chemical principles, such as by reacting a benzimidazole derivative of the formula

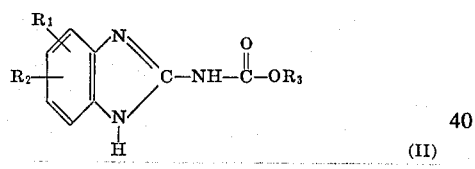

(II)

wherein $R_1$, $R_2$ and $R_3$ have the same meanings as in formula I, with an amide of the formula

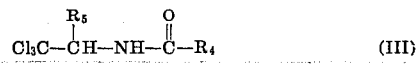

(III)

wherein $R_4$ has the same meanings as in formula I and $R_5$ is a substituent which can be easily split off as an anion, such as chlorine, bromine, alkylsulfonyl, azido, benzoyloxy, trifluoroacetoxy, arylsulfonyloxy or alkylsulfonyloxy.

The reaction is carried out in the presence of an inert organic solvent medium, such as acetone, dioxane, tetrahydrofuran, dimethylformamide, dimethylsulfoxide, methylenechloride, chloroform or mixtures of two or more of these, at a temperature between about 0° and 80°C, preferably at room temperature. In many cases it is necessary to perform the reaction in a non-homogeneous medium because some of the starting compounds of the formula II are only sparsely soluble in the organic solvent media referred to above. The reaction is advantageously carried out in the presence of an acid acceptor, preferably a tertiary aliphatic amine, such as triethylamine.

Most of the end products obtained by the process described above are solid crystalline substances which tend to form solvates with solvents used in the course of their preparation or purification; some of the compounds of the formula I are amorphous substances. The majority of the crystalline compounds melt or decompose within the temperature range of 140°–180°C, while the amorphous products have a melting point within the range of 60°–120°C.

The starting compounds of the formulas II and III are known compounds or may be prepared by methods described in the literature.

The following examples further illustrate the present invention and will enable others skilled in the art to understand it more completely. It should be understood, however, that the invention is not limited solely to the particular examples given below.

EXAMPLE 1

Preparation of 1-[(1'-formylamino-2',2',2'-trichloro)-ethyl]-2-(methoxycarbonyl-amino)-benzimidazole A solution of 6.33 gm of N-(1,2,2,2-tetrachloro-ethyl)-formamide in 20 ml of tetrahydrofuran was admixed with a suspension of 5.73 gm of powdered 2-(methoxycarbonyl-amino)-benzimidazole in 50 ml of dry pyridine, and then 3.2 gm of triethylamine were added dropwise to the mixture. Thereafter, the reaction mixture was stirred for 14 hours at room temperature and subsequently vacuum-filtered to remove undissolved matter. The filtrate was diluted with 450 ml of n-hexane, whereby a crystalline precipitate separated out which was collected by vacuum filtration, washed with methanol and dried at 60°C. 5.9 gm of 1-(1'-formylamino-2',2',2'-trichloro)-ethyl]-2-(methoxycarbonyl-amino)-benzimidazole, decomp. pt. 173°–175°C, of the formula

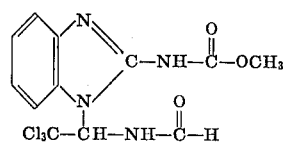

were obtained.
Analysis:
Calculated: C - 39.4%; H - 3.0%; Cl - 29.1%; N - 15.3%
Found: C - 39.6%; H - 3.1%; Cl - 29.0%; N - 15.3%

EXAMPLE 2

Preparation of 1-[(1'-chloroacetylamino-2',2',2'-trichloro)-ethyl]-2-(methoxycarbonyl-amino)-benzimidazole 4 gm of triethylamine were added dropwise to a mixture consisting of 5.73 gm of 2-(methoxycarbonyl-amino)-benzimidazole, 7.8 gm of N-(1,2,2,2-tetrachloro-ethyl)-chloroactamide and 100 ml of dry tetrahydrofuran. The resulting suspension was stirred for for 70 hours at room temperature and then filtered, the filtrate was evaporated in vacuo, and the solid residue was recrystallized from isopropanol. 7.5 gm of 1-[(1'-chloroacetylamino-2',2',2'-trichloro)-ethyl]-2-(methoxycarbonyl-amino)-benzimidazole, decomp. pt. 178°–180°C, of the formula

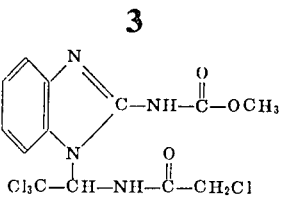

were obtained.

EXAMPLE 3

Using a procedure analogous to that described in Example 2, 1-[(1'-acryloylamino-2',2',2'-trichloro)-ethyl]-2-(methoxycarbonyl-amino)-benzimidazole, decomp. pt. 167°–169°C., of the formula

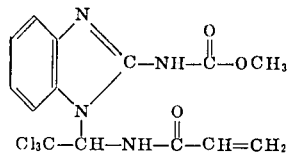

was prepared from 2-(methoxycarbonyl-amino)-benzimidazole and N-(1,2,2,2-tetrachloro-ethyl)-acrylamide.

EXAMPLE 4

Using a procedure analogous to that described in Example 2, 1-[(1'-actylamino-2',2',2'-trichloro)-ethyl]-2-(methoxycarbonyl-amino)-benzimidazole, decomp. pt. 170°C., of the formula

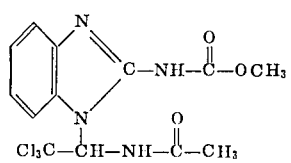

was prepared from 2-(methoxycarbonyl-amino)-benzimidazole and N-(1,2,2,2-tetrachloroethyl)-acetamide. Upon recrystallization of the product from ethanol, it was obtained as the solvate with 1 mol of ethanol of crystallization.

EXAMPLE 4a

Using a procedure analogous to that described in Example 2, 1-[(1'-formylamino-2',2',2'-trichloro)-ethyl]-2-(methoxycarbonyl-amino)-4(7)-methyl-benzimidazole, decomp. pt. 170°C., was prepared from 2-(methoxycarbonyl-amino)-4-methyl-benzimidazole and N-(1,2,2,2,-tetrachloro-ethyl)-formamide.

EXAMPLE 4b

Using a procedure analogous to that described in Example 2, 1-[(1'-acetylamino-2',2',2'-trichloro)-ethyl]-2-(methoxycarbonyl-amino)-4(7)-methyl-benzimidazole, decomp. pt. 171°–172°C., was prepared from 2-(methoxycarbonyl-amino)-4-methyl-benzimidazole and N-(1,2,2,2-tetrachloro-ethyl)-acetamide.

EXAMPLE 4c

Using a procedure analogous to that described in Example 2, 1-[(1'-acetylamino-2',2',2'-trichloro)-ethyl]-2-(isopropoxycarbonyl-amino)-5(6)-methyl-benzimidazole, m.p. 110°C., was prepared from 2-(isopropoxycarbonylamino)-5-methyl-benzimidazole and N-(1,2,2,2-tetrachloro-ethyl)-acetamide.

EXAMPLE 4d

Using a procedure analogous to that described in Example 2, 1-[(1'-formylamino-2',2',2'-trichloro)-ethyl]-2(methoxycarbonylamino)-5(6)-ethyl-benzimidazole, m.p. 90°C., was prepared from 2-(methoxycarbonyl-amino)-5-ethyl-benzimidazole and N-(1,2,2,2-tetrachloro-ethyl)-formamide.

EXAMPLE 4e

Using a procedure analogous to that described in Example 2, 1-[(1'-acetylamino-2',2',2'trichloro)-ethyl]-2-(methoxycarbonyl-amino)-5(6)-ethyl-benzimidazole, m.p. 85°C., was prepared from 2-(methoxycarbonyl-amino)-5-ethyl-benzimidazole and N-(1,2,2,2-tetrachloro-ethyl)-acetamide.

EXAMPLE 4f

Using a procedure analogous to that described in Example 2, 1-[(1'-formylamino-2',2',2'-trichloro)ethyl]-2-(methoxycarbonyl-amino)-5(6)-methoxy-benzimidazole, decomp. pt. 162°C., was prepared from 2-(methoxycarbonyl-amino)-5-methoxy-benzimidazole and N-(1,2,2,2-tetrachloro-ethyl)-formamide.

EXAMPLE 4g

Using a procedure analogous to that described in Example 2, 1-[(1'acetylamino-2',2',2'-trichloro-ethyl]-2-(methoxycarbonyl-amino)-5(6)-methoxy-benzimidazole, amorphous, m.p. 72°C., was prepared from 2-(methoxycarbonyl-amino)-5-methoxy-benzimidazole and N-(1,2,2,2-tetrachloro-ethyl)-acetamide.

EXAMPLE 4h

Using a procedure analogous to that described in Example 2, 1-[(1'-acetylamino-2',2',2'-trichloro-ethyl]-2-(methoxycarbonyl-amino)-5(6)-n-butyl-benzimidazole, amorphous, m.p. 90°C., was prepared from 2-(methoxycarbonyl-amino)-5-n-butyl-benzimidazole and N-(1,2,2,2-tetrachloro-ethyl)-acetamide.

EXAMPLE 4i

Using a procedure analogous to that described in Example 2, 1-[(1'-formylamino-2',2',2'-trichloro-ethyl]-2-(methoxycarbonyl-amino)-5((6)-n-butyl-benzimidazole, amorphous, m.p. 80°C., was prepared from 2-(methoxycarbo-nyl-amino)-5-n-butyl-benzimidazole and N-(1,2,2,2-tetra-chloroethyl)-formamide.

EXAMPLE 4k

Using a procedure analogous to that described in Example 2, 1-[(1'-formylamino-2'-2',2'-trichloro)-ethyl]-2-(ethoxycarbonyl-amino)-5(6)-methyl-benzimidazole, decomp. pt. 170°C., was prepared from 2-(ethoxycarbonyl-amino)-5-methyl-benzimidazole and N-(1,2,2,2-tetrachloroethyl)-formamide.

EXAMPLE 4l

Using a procedure analogous to that described in Example 2, 1-[(1'-formylamino-2',2',2'-trichloro)-ethyl]-2-(isopropoxycarbonyl-amino)-5(6)-methyl-benzimidazole, decomp. pt. 162°C., was prepared from 2-(isopropoxycarbo-nyl-amino)-5(6)-methyl-benzimidazole and N-(1,2,2,2-tetra-chloroethyl)-formamide.

EXAMPLE 4m

Using a procedure analogous to that described in Example 2, 1-[(1'-acetylamino-2',2',2'-trichloro)-ethyl]-2-(ethoxycarbonyl-amino)-5(6)-methyl-benzimidazole, m.p. 135°C., was prepared from 2-(ethoxycarbonyl-amino)-5(6)-methyl-benzimidazole and N-(1,2,2,2-tetrachloro-ethyl)-acetamide.

EXAMPLE 5

Using a procedure analogous to that described in Example 2, the solvate of 1-[(1'-propionylamino-2',2',2'-trichloro)-ethyl]-2-(methoxycarbonyl-amino)-benzimidazole with 0.5 mol of isopropanol of crystallization, decomp. pt. 172°–175°C., of the formula

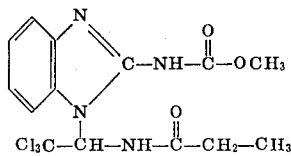

was prepared from 2-(methoxycarbonyl-amino)-benzimidazole and N-(1,2,2,2-tetrachloro-ethyl)-propionamide; the raw product was recrystallized from isopropanol.

EXAMPLE 6

Using a procedure analogous to that described in Example 2, 1-[(1'-acetylamino-2',2',2'-trichloro)-ethyl]-2-(methoxycarbonyl-amino)-5(6)-methyl-benzimidazole, decomp. pt. 168°–170°C., of the formula

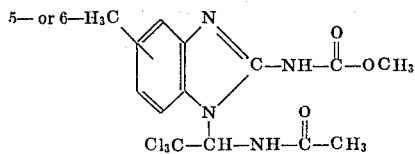

was prepared from 2-(methoxycarbonyl-amino)-5-methyl-benzimidazole and N-1,2,2,2-tetrachloroethyl)-acetamide. The amorphous raw product was dissolved in isopropanol, and the solution was allowed to stand for 24 hours during which time the product crystallized out as the solvate with 1 mol of isopropanol of crystallization, m. p. 105°C. By drying the solvate at 80°C. in vacuo, the product was obtained solvate-free.

EXAMPLE 7

Using a procedure analogous to that described in Example 2, 1-[(1'-acryloylamino-2',2',2'-trichloro)-ethyl]-2-(methoxycarbonyl-amino)-(5)6-methyl-benzimidazole, an amor-phous powder, m. p. 100°–110°C., of the formula

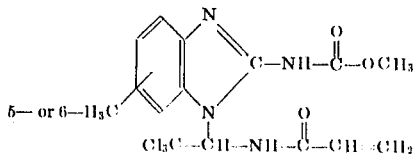

was prepared from 2-(methoxycarbonyl-amino)-6-methyl-benz-imidazole and N-(1,2,2,2-tetrachloroethyl)-acrylamide; the raw product was treated with isopropylether.

EXAMPLE 8

Using a procedure analogous to that described in Example 2, 1-[(1'-stearoylamino-2',2',2'-trichloro)-ethyl]-2-(methoxycarbonyl-amino)-benzimidazole, m. p. 105°–107°C., of the formula

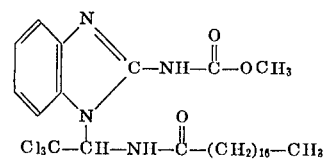

was prepared from 2-(methoxycarbonyl-amino)-benzimidazole and N-(1,2,2,2-tetrachloroethyl)-stearic acid amide.

EXAMPLE 9

Using a procedure analogous to that described in Example 2, 1-[(1'-octanoylamino-2',2',2'-trichloro)-ethyl]-2-(methoxycarbonyl-amino)-benzimidazole, decomp. pt. 155°–156°C., of the formula

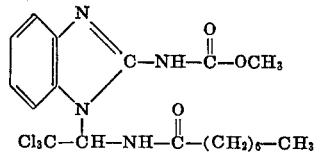

was prepared from 2-(methoxy-carbonyl-amino)-benzimidazole and N-(1,2,2,2-tetrachloroethyl)-caprylic acid amide.

EXAMPLE 10

Using a procedure analogous to that described in Example 2, 1-[(1'-formylamino-2',2',2'-trichloro)-ethyl]-2-(allyloxycarbonyl-amino)-benzimidazole, decomp. pt. 157°–159°C., of the formula

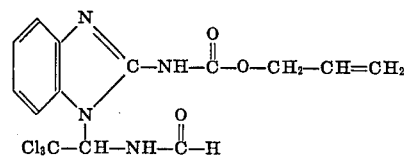

was prepared from 2-(allyloxycarbonyl-amino)-benzimidazole and N-(1,2,2,2-tetrachloroethyl)-formamide. The raw product was an amorphous substance which was caused to crystallize by treatment with isopropanol.

EXAMPLE 11

Using a procedure analogous to that described in Example 2, 1-[(1'-acryloylamino-2',2',2'-trichloro)-ethyl]-2-(allyloxycarbonyl-amino)-benzimidazole, decomp. pt. 142°–144°C., was prepared from 2-(allyloxycarbonyl-amino)-benzimidazole and N-(1,2,2,2-tetrachloroethyl)-acrylamide. The amorphous raw product was caused to crystallize as in Example 10.

EXAMPLE 12

Using a procedure analogous to that described in Example 2, 1-[(1'-acetylamino-2',2',2'-trichloro)-ethyl]-2-(allyloxycarbonyl-amino)-benzimidazole, decomp. pt. 157°–159°C., was prepared from 2-(allyloxycarbonyl-amino)-benzimidazole and N-(1,2,2,2-tetrachloroethyl)-acetamide. The raw product was caused to crystallize as in Example 10.

EXAMPLE 13

Using a procedure analogous to that described in Example 2, 1-[(1'-stearoylamino-2',2',2'-trichloro)-ethyl]-2-(allyloxycarbonyl-amino)-benzimidazole was prepared from 2-(allyloxycarbonyl-amino)-benzimidazole and N-(1,2,2,2-tetrachloroethyl)-stearic acid amide. The raw product was a semisolid substance which crystallized upon treatment with isopropanol. After recrystallization from isopropanol, the product melted at 90°C. and upon further heating solidified again and finally decomposed at 170°C.

EXAMPLE 14

Using a procedure analogous to that described in Example 2, 1-[(1'-benzoylamino-2',2',2'-trichloro)-ethyl]-2-(allyloxycarbonyl-amino)-benzimidazole, decomp. pt. 157°–159°C., of the formula

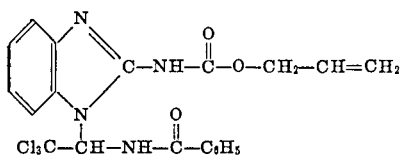

was prepared from 2-(allyloxycarbonyl-amino)-benzimidazole and N-(1,2,2,2-tetrachloroethyl)-benzamide in the presence of triethylamine. The raw product was recrystallized from isopropanol.

EXAMPLE 15

Using a procedure analogous to that described in Example 2, 1-[(1'-octanoylamino-2',2',2'-trichloro)-ethyl]-2-(allyloxycarbonyl-amino)-benzimidazole, decomp. pt. 141°–142°C., was prepared from 2-(allyloxycarbonyl-amino)-benz-imidazole and N-(1,2,2,2-tetrachloroethyl)-octanoic acid amide.

EXAMPLE 16

Using a procedure analogous to that described in Example 2, 1-[(1'-ethoxycarbonylamino-2',2',2'-trichloro)-ethyl]-2-(allyloxycarbonyl-amino)-benzimidazole, of the formula

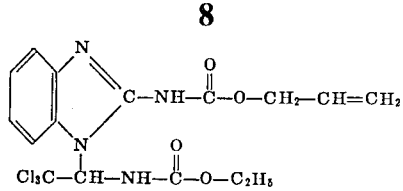

was prepared from 2-(allyloxycarbonyl-amino)-benzimidazole and N-(1,2,2,2-tetrachloroethyl)-urethane. The raw product was recrystallized from isopropanol, yielding the product as the solvate with 1 mol of isopropanol of crystallization. The solvate melted initially at 81°C. and upon further heating solidified again and finally decomposed at 175°C.

EXAMPLE 17

Using a procedure analogous to that described in Example 2, 1-[(1'-formylamino-2',2',2'-trichloro)-ethyl]-2-(methoxycarbonyl-amino)-5,6-dimethyl-benzimidazole, decomp. pt. 173°–175°C. (from isopropanol), of the formula

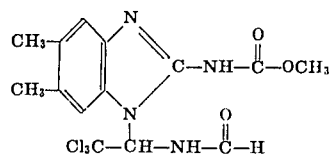

was prepared from 2-(methoxycarbonyl-amino)-5,6-dimethyl-benzimidazole and N-(1,2,2,2-tetrachloroethyl)-formamide.

EXAMPLE 18

Using a procedure analogous to that described in Example 2, 1-[(1'-acetylamino-2',2',2'-trichloro)-ethyl]-2-(methoxycarbonyl-amino)-5,6-dimethyl-benzimidazole, decomp. pt. 170°C., of the formula

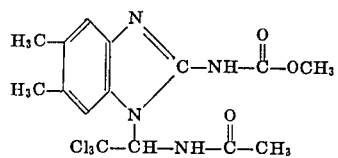

was prepared from 2-(methoxycarbonyl-amino)-5,6-dimethyl-benzimidazole and N-(1,2,2,2-tetrachloroethyl)-acetamide. The raw product was recrystallized from isopropanol, yielding the product as the solvate with 0.5 mol of isopropanol of crystallization.

EXAMPLE 19

Using a procedure analogous to that described in Example 2, 1-[(1'-formylamino-2',2',2'-trichloro)-ethyl]-2-(methoxycarbonyl-amino)-5(6)-chloro-benzimidazole, decomp. pt. 146°–148°C., of the formula

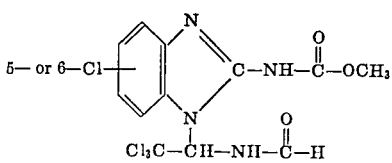

was prepared from 2-(methoxycarbonyl-amino)-5-chloro-benzimidazole and N-(1,2,2,2-tetrachloroethyl)-formamide. The raw product was recrystallized from isopropanol, yielding the solvent with 0.5 mol of isopropanol of crystallization.

EXAMPLE 20

Using a procedure analogous to that described in Example 2, 1-[(1'-acetylamino-2',2',2'-trichloro)-ethyl]-2-(methoxycarbonyl-amino)-(5)6-chloro-benzimidazole, decomp. pt. 152°–154°C., of the formula

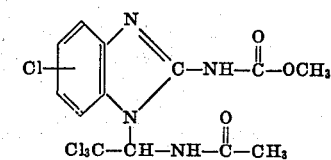

was prepared from 2-(methoxycarbonyl-amino)-benzimidazole and N-(1,2,2,2-tetrachloroethyl)-acetamide. Recrystallization from isopropanol yielded the solvate with 1 mol of isopropanol of crystallization.

EXAMPLE 21

Using a procedure analogous to that described in Example 2, 1-[(1'(-o,p-dichlorophenoxyacetyl-amino)-2',2',2'-trichloro-ethyl]-2-(methoxycarbonyl-amino)-benzimidazole, decomp. pt. 154°C. (from isopropanol), of the formula

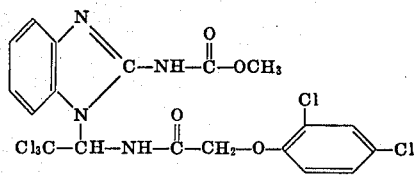

was prepared from 2-(methoxycarbonyl-amino)-benzimidazole and N-(1,2,2,2-tetrachloroethyl)-o,p-dichlorophenoxy-acetamide.

EXAMPLE 22

Using a procedure analogous to that described in Example 2, 1-[(1'-chloroacetylamino-2',2',2'-trichloro)-ethyl]-2-(methoxycarbonyl-amino)-5(6)-methyl-benzimidazole, decomp. pt. 146°–148°C., of the formula

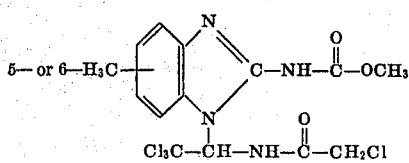

was prepared from 2-(methoxycarbonyl-amino)-5-methyl-benzimidazole and N-(1,2,2,2-tetrachloroethyl)-chloroacetamide.

EXAMPLE 23

Using a procedure analogous to that described in Example 2, 1-[(1'-pivaloylamino-2',2',2'-trichloro)-ethyl]-2-(methoxycarbonyl-amino)-(5)6-methyl-benzimidazole, decomp. pt. 174°–176°C., of the formula

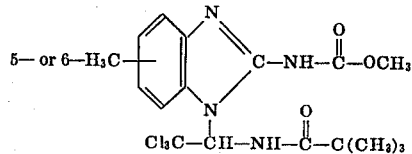

was prepared from 2-(methoxycarbonyl-amino)-6-methyl-benzimidazole and N-(1,2,2,2-tetrachloroethyl)-pivalic acid amide.

EXAMPLE 24

Preparation of 1-[(1'-pivaloylamino-2',2',2'-trichloro)-ethyl]-2-(methoxycarbonyl-amino)-benzimidazole 3.8 gm of triethylamine were added dropwise to a mixture consisting of 5.73 gm of 2-(methoxycarbonyl-amino)-benzimidazole and 8 gm of N-(1,2,2,2-tetrachloro-ethyl)-trimethylacetamide and 100 ml of tetrahydrofuran. Thereafter, the reaction mixture was stirred at room temperature for 48 hours, the insoluble matter was separated by vacuum filtration, the filtrate was evaporated, and the residue was stirred with 50 ml of isopropanol. The light-gray crystalline substance formed thereby was collected by vacuum filtration and digested with 200 ml of acetone. The insoluble malt was filtered off, the filtrate was evaporated in vacuo, and the residue was recrystallized from isopropanol, yielding 5.8 gm of 1-[(1'-pivaloylamino-2',2',2'-trichloro)-ethyl]-2-(methoxycarbonyl-amino)-benzimidazole, decomp. pt. 170°–172°C.

EXAMPLE 25

Preparation of 1-[(1'-methacryloylamino-2',2',2'-trichloro)-ethyl]-2-(methoxycarbonyl-amino)-benzimidazole 4 gm of triethylamine were added dropwise to a mixture consisting of 5.73 gm of 2-(methoxycarbonyl-amino)-benzimidazole, 7.5 gm of N-(1,2,2,2-tetrachloro-ethyl)-methacrylamide and 50 ml of dimethylsulfoxide. Thereafter, the reaction mixture was stirred at room temperature for 16 hours, and then the insoluble matter, which consisted largely of triethylamine hydrochloride, was separated by vacuum filtration. The filtrate was admixed with 200 ml of water, and the crystalline precipitate formed thereby was collected by vacuum filtration, washed with water and recrystallized from isopropanol. 4.5 gm of 1-[(1'-metha-cryloylamino-2',2',2'-trichloro)-ethyl]-2-(methoxycarbonylamino)-benzimidazole, decomp. pt. 149°–152°C., of the formula

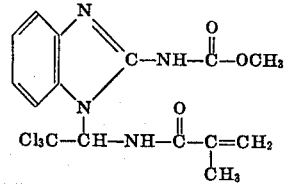

were obtained.

EXAMPLE 26

Using a procedure analogous to that described in Example 25, 1-[(1'-acryloylamino-2',2',2'-trichloro)-ethyl]-2-(ethoxycarbonyl-amino)-benzimidazole, decomp. pt. 153°–156°C., of the formula

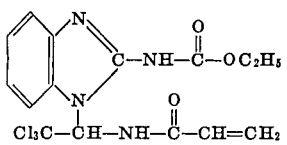

was prepared from 2-(ethoxy carbonyl-amino-benzimidazole and N-(1,2,2,2-tetrachloro-ethyl)-acrylamide.

EXAMPLE 27

Using a procedure analogous to that described in Example 25, 1-[(1'-pivaloylamino-2',2',2'-trichloro)-ethyl]-2-(ethoxycarbonyl-amino)-benzimidazole, decomp. pt. 166°–170°C., was prepared from 2-(ethoxycarbonyl-amino)-benzimidazole and N-(1,2,2,2-tetrachloro-ethyl)-trimethylacetamide.

EXAMPLE 28

Preparation of 1-[(1'-formylamino-2',2',2'-trichloro)-ethyl]-2-(methoxycarbonyl-amino)-5(6)-methyl-benzimidazole 10.2 gm of 2-(methoxycarbonyl-amino)-5-methyl-benzimidazole were suspended in 100 ml of anhydrous dimethylformamide, and 10.5 gm of N-(1,2,2,2-tetrachloro-ethyl)-formamide were dissolved in the suspension, and then, while stirring the mixture, 5.1 gm of triethylamine were added dropwise thereto. Thereafter, the reaction mixture was stirred for three hours at room temperature, and then the insoluble matter was separated by vacuum filtration. The filter cake consisted of triethylamine hydrochloride and 4 gm of unreacted 2-(methoxycarbonyl-amino)-5-methyl-benzimidazole. The filtrate was admixed with 500 ml of water, and the precipitate formed thereby was collected by vacuum filtration and recrystallized from isopropanol, yielding 5.6 gm of 1-[(1'-formylamino-2',2',2'-trichloro)-ethyl]-2-(methoxycarbonyl-amino)-5(6)-methyl-benzimidazole, decomp. pt. 172°C., in the form of the solvate with 0.5 mol of isopropanol of crystallization.

The compounds according to the present invention, that is, those embraced by formula I above, have useful properties. More particularly, the compounds of the instant invention exhibit very effective systemic fungicidal activities against a broad variety of phytopathogenic fungi, such as real mildew fungi (*Erysiphe graminis* and *Podosphaera leucotricha*), plant rust fungi (*Puccinia recondita* and *Uromyces fabae*), blight mildew fungi (*Phytophthora infestans* and *Altemaria solani*), cercospora, botrytis, fusanium, piricularia, verticillium, venturia maequalis and the like.

Since the compounds of the invention are systemic fungicides, they have a prophylactic as well as curative action. In addition, they may also be used an anthelmintics, ovicides and acaricides.

Those compounds of the formula I wherein $R_4$ is 2,4-dichlorophenoxy-alkyl also exhibit herbicidal activities.

For use as fungicidal agents, the compounds of the present invention are incorporated as active ingredients into conventional agricultural fungicidal compositions, such as wettable powders, emulsion concentrates, solutions, sprays, granulates, dusting powders and the like, i.e., compositions consisting essentially of an inert liquid or solid carrier and an effective fungicidal amount of the active ingredient. By virtue of their good solubilities in organic solvents, the compounds of the present invention are particularly well adapted for the preparation of highly concentrated solutions and emulsion concentrates which are diluted with water to the desired concentration of active ingredient just prior to their use as fungicidal dispersions on plants. The active ingredient concentration range in the agricultural compositions is preferably about 0.05 to 80 percent by weight, based on the total weight, and the concentrated compositions may be diluted to an active ingredient concentration of 0.5 to 0.0001 percent prior to use, although dusting powders and so-called ultra-low-volume compositions (ULV) may also have a higher active ingredient content.

The following examples illustrate a few prophylactic fungicidal compositions comprising a compound of the present invention as an active ingredient and represent the best modes contemplated of putting the invention into practical use. The parts are parts by weight unless otherwise specified.

EXAMPLE 29

Dusting Powder

The powder composition was compounded from the following ingredients:

| | |
|---|---|
| Product of Example 1 | 5 parts |
| Synthetic silicic acid | 5 parts |
| Talcum | 90 parts |

Preparation:

The benzimidazole compound and the silicic acid were admixed with each other, the mixture was milled and the talcum was added, and the finished composition was milled into a fine powder. The resulting dusting power was an effective prophylactic and curative fungicide when applied to plants.

EXAMPLE 30

Spray

The spray composition was compounded from the following ingredients:

| | |
|---|---|
| Product of Example 2 | 10 parts |
| Dimethylformamide | 50 parts |
| 1,2-propyleneglycol | 40 parts |
| Condensation product octylphenol and 10 mols of ethyleneglycol (wetting agent) | 10 parts |

Preparation:

The ingredients were intimately admixed with each other, resulting in a liquid concentrate which, when diluted with water into a sprayable aqueous emulsion containing from 0.5 to 0.0001 percent active ingredient, was an effective prophylactic fungicide when applied to plants.

EXAMPLE 31

Aerosol Spray

The spray composition was compounded from the following ingredients:

| | |
|---|---|
| Product of Example 6 | 0.05 parts |
| Sesame oil | 0.10 parts |
| N-Methyl-pyrrolidone | 10.00 parts |
| Mixture of Frigen 11 and 12 | 89.85 parts |

Preparation:

The benzimidazole compound and the sesame oil were dissolved in the N-methyl-pyrrolidone, the solution was charged into an aerosol container, which was then pressurized with the Frigen propellant gas mixture. The resulting aerosol spray was an effective fungicide when applied to plants.

EXAMPLE 32

Suspension Powder

The powder composition was compounded from the following ingredients:

| | |
|---|---|
| Product of Example 4 | 80 parts |
| Calcium lignin sulfonate | 8 parts |
| Colloidal silicic acid | 5 parts |
| Sodium sulfate | 5 parts |
| Diisobutyl naphthalene sodium sulfonate | 2 parts |

Preparation:

The ingredients were intimately admixed with each other, and the mixture was milled into a fine powder, which was then suspended in a sufficient amount of water to make the active ingredient content of the aqueous suspension from 0.5 to 0.001 percent by weight. The resulting sprayable suspension was an effective prophylactic and curative fungicide when applied to plants.

Analogous results were obtained when any one of the other compounds embraced by formula I was substituted for the particular active ingredient in Examples 29 through 32. Likewise, the amount of active ingredient in these illustrative examples may be varied to achieve the concentration range set forth above, and the amounts and nature of the inert carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

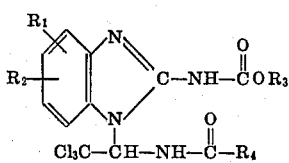

wherein $R_1$ and $R_2$ are each hydrogen, chlorine, bromine, alkyl of one to four carbon atoms or alkoxy of one to four carbon atoms, $R_3$ is alkyl of one to three carbon atoms or allyl, and $R_4$ is hydrogen, alkyl of one to 17 carbon atoms, alkyl of one to 17 carbon atoms having from one to three halogen substituents or one 2,4-dichlorophenoxy substituent attached thereto, phenyl, lower alkenyl or alkoxy of one to 12 carbon atoms.

2. A compound of the formula

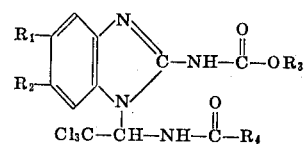

wherein $R_1$ and $R_2$ are each hydrogen, methyl or chlorine, but other than both chlorine at the same time, $R_3$ is methyl, ethyl or allyl, and $R_4$ is hydrogen, alkyl of one to 17 carbon atoms, chloromethyl, dichlorophenoxy-methyl, phenyl, ethoxy, vinyl or β-propenyl.

3. A compound according to claim 2, which is 1-[(1'-formylamino-2',2',2'-trichloro)-ethyl]-2-(methoxycarbonyl-amino-benzimidazole.

4. A compound according to claim 2, which is 1-[(1'-chloroacetylamino-2',2',2'-trichloro)-ethyl]-2-(methoxycarbonyl-amino)-benzimidazole.

5. A compound according to claim 2, which is 1-[(1'-acryloylamino-2',2',2'-trichloro)-ethyl]-2-(methoxycarbonyl-amino)-benzimidazole.

6. A compound according to claim 2, which is 1-[(1'-acetylamino-2',2',2'-trichloro)-ethyl]-2-(methoxycarbonyl-amino)-benzimidazole.

7. A compound according to claim 2, which is 1-[(1'-propionylamino-2',2',2'-trichloro)-ethyl]-2-(methoxycarbonyl-amino)-benzimidazole.

8. A compound according to claim 2, which is 1-[(1'-acetylamino-2',2',2'-trichloro-ethyl]-2-(methoxycarbonyl-amino)-5(6)-methyl-benzimidazole.

9. A compound according to claim 2, which is 1-[(1'-acryloylamino-2',2',2'-trichloro)-ethyl]-2-(methoxycarbonyl-amino)-(5)6-methyl-benzimidazole.

10. A compound according to claim 2, which is 1-[(1'-stearoylamino-2',2',2'-trichloro)-ethyl]-2-(methoxycarbonyl-amino)-benzimidazole.

11. A compound according to claim 2, which is 1-[(1'-octanoylamino-2',2',2'-trichloro)-ethyl]-2-(methoxycarbonyl-amino)-benzimidazole.

12. A compound according to claim 2, which is 1-[(1'-formylamino-2',2',2'-trichloro)-ethyl]-2-(allyloxycarbonyl-amino)-benzimidazole.

13. A compound according to claim 2, which is 1-[(1'-acryloylamino-2',2',2'-trichloro)-ethyl]-2-(allyloxycarbonyl-amino)-benzimidazole.

14. A compound according to claim 2, which is 1-[(1'-acetylamino-2',2',2'-trichloro)-ethyl]-2-(allyloxycarbonyl-amino)-benzimidazole.

15. A compound according to claim 2, which is 1-[(1'-stearoylamino-2',2',2'-trichloro)-ethyl]-2-(allyloxycarbonyl-amino)-benzimidazole.

16. A compound according to claim 2, which is 1-[(1'-benzoylamino-2',2',2'-trichloro)-ethyl]-2-(allyloxycarbonyl-amino)-benzimidazole.

17. A compound according to claim 2, which is 1-[(1'-octanoylamino-2',2',2'-trichloro)-ethyl]-2-(allyloxycarbonyl-amino)-benzimidazole.

18. A compound according to claim 2, which is 1-[(1'-ethoxycarbonylamino-2',2',2'-trichloro)-]-2-(allyloxycarbonyl-amino)-benzimidazole.

19. A compound according to claim 2, which is 1-[(1'-formylamino-2',2',2'-trichloro)-ethyl]-2-(methoxycarbonyl-amino)-5,6-dimethyl-benzimidazole.

20. A compound according to claim 2, which is 1-[(1'-acetylamino-2',2',2'-trichloro)-ethyl]-2-(methoxycarbonyl-amino)-5,6-dimethyl-benzimidazole.

21. A compound according to claim 2, which is 1-[(1'-formylamino-2',2',2'-trichloro)-ethyl]-2-(methoxycarbonyl-amino)-5(6)-chloro-benzimidazole.

22. A compound according to claim 2, which is 1-[(1-acetylamino-2',2',2'-trichloro)-ethyl]-2-(methoxycarbonyl-amino)-(6)6-chloro-benzimidazole.

23. A compound according to claim 2, which is 1-[1'-(o,p-dichlorophenoxyacetyl-amino)-2',2',2'-trichloroethyl]-2-(methoxycarbonyl-amino)-benzimidazole.

24. A compound according to claim 2, which is 1-[(1'-chloroacetylamino-2',2',2'-trichloro)-ethyl]-2-(methoxycarbonyl-amino)-5(6)-methyl-benzimidazole.

25. A compound according to claim 2, which is 1-[(1'-pivaloylamino-2',2',2'-trichloro)-ethyl]-2-(methoxycarbonyl-amino)-(-(methoxycarbonyl-amino)-((5)6-methyl-benzimidazole.

26. A compound according to claim 2, which is 1-[(1'-pivaloylamino-2',2',2'-trichloro)-ethyl]-2-(methoxycarbonyl-amino)-benzimidazole.

27. A compound according to claim 2, which is 1-[(1'-methacryloylamino-2',2',2'-trichloro)-ethyl]-2-(methoxycarbonyl-amino)-benzimidazole.

28. A compound according to claim 2, which is 1-[(1'-acryloylamino-2',2',2'-trichloro)-ethyl]-2-(ethoxycarbonyl-amino)-benzimidazole.

29. A compound according to claim 2, which is 1-[(1'-pivaloylamino-2',2',2'-trichloro)-ethyl]-2-(ethoxycarbonyl-amino)-benzimidazole.

30. A compound according to claim 2, which is 1-[(1'-forymlamino-2',2',2'-trichloro)-ethyl]-2-(methoxycarbonyl-amino)-5(6)-methyl-benzimidazole.

31. A compound according to claim 1, which is 1-[(1'-acetylamino-2',2',2'-trichloro)-ethyl]-2-(methoxycarbonyl-amino)-5(6)-methoxy-benzimidazole.

32. A compound according to claim 1, which is 1-[(1'-acetylamino-2',2',2'-trichloro)-ethyl]-2-(ethoxycarbonyl-amino)-5(6)-methyl-benzimidazole.

33. A compound according to claim 1, which is 1-[(1'-acetylamino-2',2',2'-trichloro)-ethyl]-2-(methoxycarbonyl-amino)-4(7)-methyl-benzimidazole.

* * * * *